(12) United States Patent
Wang et al.

(10) Patent No.: US 8,880,813 B2
(45) Date of Patent: Nov. 4, 2014

(54) METHOD AND DEVICE FOR MULTITHREAD TO ACCESS MULTIPLE COPIES

(75) Inventors: Wei Wang, Hangzhou (CN); Yiyang Liu, Hangzhou (CN); Xiaofeng Zhang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 153 days.

(21) Appl. No.: 13/339,230

(22) Filed: Dec. 28, 2011

(65) Prior Publication Data

US 2012/0297149 A1 Nov. 22, 2012

Related U.S. Application Data

(63) Continuation of application No. PCT/CN2011/074384, filed on May 20, 2011.

(51) Int. Cl.
*G06F 5/08* (2006.01)
*G06F 12/10* (2006.01)

(52) U.S. Cl.
CPC .... *G06F 12/1009* (2013.01); *G06F 2212/2542* (2013.01)
USPC .......................................... 711/150; 711/162

(58) Field of Classification Search
CPC . G06F 12/0817; G06F 3/067; G06F 11/2094; G06F 12/0822; G06F 12/1009; G06F 3/065
See application file for complete search history.

(56) References Cited

U.S. PATENT DOCUMENTS

| 6,269,391 | B1 | 7/2001 | Gillespie |
| 6,785,888 | B1 | 8/2004 | McKenney et al. |
| 7,370,156 | B1 * | 5/2008 | Nguyen et al. ................ 711/147 |
| 2003/0066056 | A1 | 4/2003 | Petersen et al. |
| 2008/0092138 | A1 | 4/2008 | Chung et al. |
| 2009/0254724 | A1 * | 10/2009 | Vertes et al. .................. 711/162 |
| 2012/0233409 | A1 * | 9/2012 | Ross et al. .................... 711/135 |

FOREIGN PATENT DOCUMENTS

| CN | 1842769 A | 10/2006 |
| CN | 101464900 A | 6/2009 |
| CN | 101563674 A | 10/2009 |
| EP | 2437462 A2 | 4/2012 |
| WO | WO 2008074520 A1 | 6/2008 |

OTHER PUBLICATIONS

Office Action issued in corresponding Chinese Patent Application No. 201180000553.1, mailed Oct. 8, 2012.

(Continued)

*Primary Examiner* — Matthew Bradley
*Assistant Examiner* — Candice Rankin
(74) *Attorney, Agent, or Firm* — Brinks Gilson & Lione

(57) ABSTRACT

A method and a device for multithread to access multiple copies. The method includes: when multiple threads of a process are distributed to different nodes, creating a thread page directory table whose content is the same as that of a process page directory table of the process, where each thread page directory table includes a special entry which points to specific data and a common entry other than the special entry, each thread corresponds to a thread page directory table, and the specific data is data with multiple copies at different nodes; and when each thread is scheduled and the special entry in the thread page directory table of the each thread does not point to the specific data stored in a node where the thread is located, modifying, based on a physical address of the specific data, the special entry to point to the specific data.

18 Claims, 8 Drawing Sheets

(56) References Cited

OTHER PUBLICATIONS

Extended European Search Report issued in corresponding European Patent Application No. 11768473.8, mailed Jul. 3, 2012.

Chang et al., "Performance Analysis of a CC-NUMA Operating System" Proceedings of the 15th International Parallel and Distributed Processing Symposium, Apr. 2001.

International Search Report issued in corresponding PCT Patent Application No. PCT/CN2011/074384, mailed Mar. 8, 2012.

* cited by examiner

METHOD AND DEVICE FOR MULTITHREAD TO ACCESS MULTIPLE COPIES

CROSS-REFERENCE TO RELATED APPLICATIONS

This application is a continuation of International Application No. PCT/CN2011/074384, filed on May 20, 2011, which is hereby incorporated by reference in its entirety.

FIELD OF THE APPLICATION

The present application relates to the field of computer, and in particular, relates to a method and a device for multithread to access multiple copies in the field of computer.

BACKGROUND OF THE APPLICATION

NUMA (Non-uniform Memory Access, Non-uniform Memory Access) is a distributed structure, and each processor is mounted with a memory, a peripheral, and the like. Each group of processor and memory are connected to the same system, so the NUMA expresses its advantage in expandability, and has been widely applied in the field of medium and high-grade servers due to the features such as high reliability, high applicability, and high serviceability.

Any processor in nodes of the NUMA may access a random memory, so that different delays exist when each processor accesses different memories. With the extension of the system, NUMA nodes are increased gradually, so the delay for the processor to access remote nodes is greatly increased correspondingly, thereby affecting the overall performance of the system. Especially, for data frequently accessed in the system (for example, a kernel code and the kernel read-only data), if the data only exists in one node, processors of other nodes may have large delay when accessing the data. Moreover, if the data is accessed by the processors of multiple nodes in a short time, transmission bandwidth of interconnected hardware becomes another factor that affects the performance.

In related techniques, data frequently accessed in the system may be copied to a memory of each node, in this way, each node has a local copy, and a progress running on each node may access the local copy, thereby avoiding the delay influence caused by having to access the data frequently accessed at another node, and reducing transmission bandwidth consumption of the interconnected hardware.

By taking the kernel code and kernel read-only data as examples, in order to implement kernel multi-copy, enough memory may be applied for each node, and then, the kernel code and the kernel read-only data are copied to the new area. A mapping relationship between the kernel multi-copy in each node and a corresponding linear address is obtained through calculation. When a process is scheduled to a certain node, some entries of a process page directory table are changed based on the mapping relationship of the kernel copy saved in the node, so that the process may access the kernel code copy of this node through content of the process page directory table.

Through the kernel multi-copy technology, the process is enabled to access the kernel code and the kernel read-only data on this node; however, if the process creates multiple threads and the threads are distributed to different nodes to be executed, the threads still run on the basis of the content of the process page directory table. In this way, the kernel copy pointed to by the process page directory table is located in one node, so the multiple threads cannot access the kernel copy saved in the node, and large delay may still be generated and the accessing is limited by the transmission bandwidth of interconnected hardware.

SUMMARY OF THE APPLICATION

Embodiments provide a method and a device for multithread to access multiple copies, so that threads distributed to different nodes may access data that is with multiple copies and is saved in the nodes where the threads are located, thereby improving system performance.

In one aspect, a method for multithread to access multiple copies provided in an embodiment includes: when multiple threads of a process are distributed to different nodes, creating a thread page directory table whose content is the same as that of a process page directory table of the process, where each thread page directory table includes a special entry, which points to specific data, and a common entry other than the special entry, each thread corresponds to a thread page directory table, execution of each thread is based on a corresponding thread page directory table, and the specific data is data with multiple copies at different nodes; when each thread is scheduled and the special entry in the thread page directory table of the each thread does not point to the specific data stored in the node where the thread is located, modifying, based on a physical address of the specific data, the special entry to point to the specific data.

In another aspect, a device for multithread to access multiple copies provided in an embodiment includes: a first creating module, configured to, when multiple threads of a process are distributed to different nodes, create a thread page directory table whose content is the same as that of a process page directory table of the process, where each thread page directory table includes a special entry, which points to specific data, and a common entry other than the special entry, each thread corresponds to a thread page directory table, execution of each thread is based on a corresponding thread page directory table, and the specific data is data with multiple copies at different nodes; and a modifying module, configured to, when each node is scheduled and the special entry in the tread page directory table of the each thread does not point to the specific data stored in a node where the thread is located, modify, based on a physical address of the specific data, the special entry to point to the specific data.

Based on the technical solutions, by creating the thread page directory table, and enabling the special entry in the thread directory table to point to the data with multiple copies in the node where the thread is located, the threads distributed to the different nodes may access the data copies stored in nodes where the threads are located, thereby avoiding the delay generated by the threads accessing remote data and avoiding the limit of transmission bandwidth of interconnected hardware, so as to improve system performance.

BRIEF DESCRIPTION OF THE DRAWINGS

In order to illustrate the technical solutions in embodiments more clearly, accompanying drawings needed in the embodiments are illustrated briefly in the following. It is evident that the accompanying drawings are only some embodiments, and persons skilled in the art may obtain other drawings according to the accompanying drawings without any creative effort.

DETAILED DESCRIPTION OF THE EMBODIMENTS

The technical solutions are hereinafter described in detail with reference to the accompanying drawings. It is evident that the embodiments are only some, rather than all embodiments. Other embodiments that are obtained by persons skilled in the art on the basis of the embodiments should also fall within the protection scope of the claims.

Figure 1:
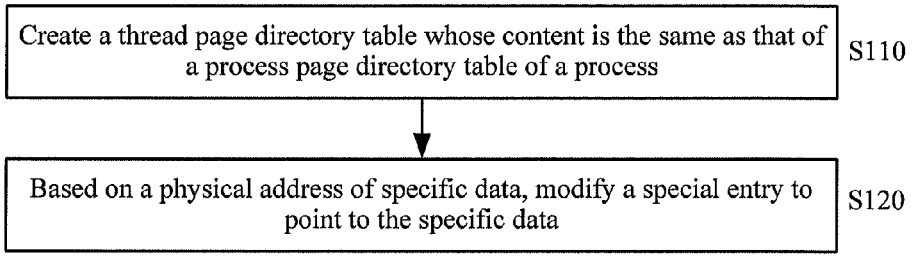
FIG. 1 is a flow chart of a method for multithread to access multiple copies according to an embodiment.

First, a method 100 for multithread to access multiple copies according to an embodiment is described in accompanying with FIG. 1.

As shown in FIG. 1, the method 100 includes: in S110, when multiple threads of a process are distributed to different nodes, create a thread page directory table whose content is the same as that of a process page directory table of the process, where each thread page directory table includes a special entry, which pointes to specific data, and a common entry other than the special entry, each thread corresponds to a thread page directory table, execution of each thread is based on the corresponding thread page directory table, and the specific data is data with multiple copies at different nodes; and in S120, when each thread is scheduled and the special entry in the thread page directory table of the each thread does not point to the specific data stored in a node where the thread is located, modify, based on a physical address of the specific data, the special entry to point to the specific data.

In this way, by creating the thread page directory table, and enabling the special entry in the thread directory table to point to the specific data that is with multiple copies at different nodes and is stored in the node where the thread is located, the threads distributed to different nodes may access the specific data in the nodes, thereby avoiding the delay generated by the threads accessing remote data and avoiding the limit of transmission bandwidth of interconnected hardware, so as to improve system performance.

In S110, the process may be divided into multiple threads, and the threads may be distributed to different nodes to be executed. The nodes may be nodes in NUMA architecture, nodes supporting multi-processor concurrent operation in other system structures having expandability, or nodes in any device requiring the implementation of multithread accessing read-only data frequently.

The thread page directory table may be created for a thread, so that the thread is executed based on the thread page directory table corresponding to the thread.

For example, each thread may correspond to their respective thread page directory table only. In this way, if the process is divided into 20 threads, 20 thread page directory tables need to be created for the 20 threads, and the threads and the thread page directory tables are in one-to-one correspondence.

For another example, each thread corresponds to one thread page directory table shared by at least two threads that are located on the same node as the each thread. In this way, if the process is divided into 20 threads and the 20 threads are averagely allocated to 4 nodes, each node may only has one thread page directory table shared by all the threads on this node. Therefore, compared with the situation in which the threads and the thread page directory tables are in one-to-one correspondence, the number of thread page directory tables requiring maintenance is reduced, thereby reducing the system overhead. Definitely, persons skilled in the art may derive that, in this example, one node may also has two thread page directory tables, one of the two thread page directory tables is shared by two of 5 threads of this node, and the other is shared by the rest 3 threads.

For another example, a part of threads in the multiple threads each correspond to their respective thread page directory tables only, and each of other threads may have one thread page directory table shared by at least two threads that are located on the same node as the each thread. This situation is a combination of foregoing two situations. For example, after the 20 threads included in the process is averagely allocated to the 4 nodes, for 5 threads on a certain node, 2 threads of the 5 threads may each have their respective thread page directory tables only, and other 3 threads may share a thread page directory table. At this time, this node totally has 3 thread page directory tables.

Definitely, persons skilled in the art may also find other manners for setting the thread page directory tables. No matter one thread page directory table corresponds to one thread or more than one thread, one thread corresponds to one thread page directory table and runs based on the thread page directory table corresponding to the one thread.

An initial value of an entry in the thread page directory table may be the same as that of an entry in the process page directory table. In the thread page directory table, entries may be divided into two parts, that is, a special entry and a common entry. The special entry points to specific data, and the specific data is data with multiple copies at different nodes. For example, the specific data may be a kernel code and kernel read-only data, may be all read-only data in a memory, may also be part of the read-only data in the memory, and definitely, may also be a combination of the foregoing content. Generally, the data with multiple copies at different nodes is data that is needed to be accessed frequently, so the specific data may also be the data accessed frequently.

All of the created thread page directory tables may be newly created thread page directory tables, and the thread page directory tables may also be obtained by sharing the process page directory table. For example, the process page directory table may be set as a thread page directory table of a main thread, and for another thread, a thread page directory table whose content is the same as that of the process page directory table is generated. At this time, the created thread page directory table of the main thread is the process page directory table, and a pointer of the thread page directory table of the main thread is pointed to the process page directory table, or may be set to be null to point to the process page directory table by default. For another thread other than the main thread, a thread page directory page needs to be newly generated.

In S120, when a thread is scheduled, an address of a thread page directory table corresponding to the thread is loaded to a hardware register to execute the thread. For example, the hardware register may be a CR3 register under an X86 platform. If a special entry in a thread page directory table of a certain thread does not point to specific data in a node where the thread is located, the special entry is modified to point to the specific data in this node. During the modification, a physical address that is of the specific data and is stored in this node needs to be referred to, and the special entry is modified based on the physical address.

In this way, after modifying the special entry of the thread page directory table to point the specific data such as the kernel code and the read-only data, during the procedure of executing the thread, the thread may access, based on the special entry in the corresponding thread page directory table, the specific data in the node where the thread is located, thereby implementing multithread accessing the multiple copies, avoiding the delay caused by accessing remote data and avoiding high requirements on the transmission bandwidth, increasing efficiency of access to the data accessed frequently, and improving the system performance.

Figure 2:
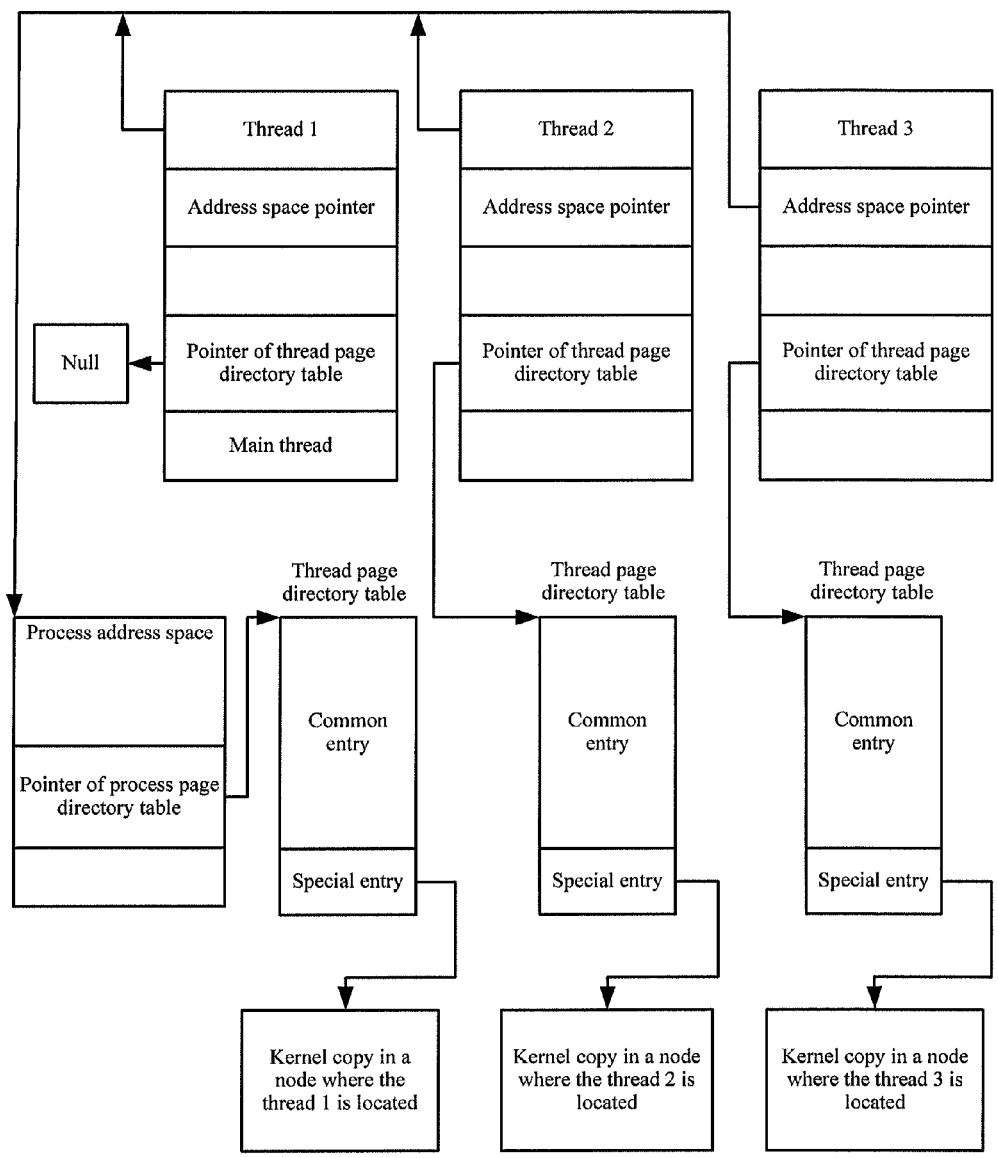
FIG. 2 is a schematic diagram of a logic structure of implementing multithread accessing multiple copies according to an embodiment.

FIG. 2 is taken as an example to describe a schematic diagram of a logic structure of implementing multithread accessing multiple copies through thread page directory tables. FIG. 2 only shows a logic structure related to the embodiment, instead of all logic structures.

In the FIG. 2, a process is divided into three threads, namely, thread 1, thread 2, and thread 3. Moreover, the three threads are located in different nodes respectively. Address space pointers of the threads 1, 2, and 3 respectively point to process address space.

The thread 1 is a main thread, and a process page directory table may be considered as a thread page directory table of the thread 1, so a pointer of the thread page directory table of the thread 1 is a null pointer, and is considered to be the same as a pointer of the process page directory table by default. Definitely, the pointer of the thread page directory table of the thread 1 may also be set to a value pointing to the process page directory table. Pointers of thread page directory tables of the thread 2 and the thread 3 each point to respective thread page directory tables of the thread 2 and the thread 3.

The thread page directory table is divided into two parts, namely, a special entry and a common entry. The special entry is used to point to data with multiple copies at different nodes. In FIG. 2, it is assumed that the data with multiple copies is a kernel copy including a kernel code and kernel read-only data, so the special entry in the thread page directory table of the thread 1 points to the kernel copy of the node where the thread 1 is located, the special entry in the thread page directory table of the thread 2 points to the kernel copy of the node where the thread 2 is located, and the special entry in the thread page directory table of the thread 3 points to the kernel copy of the node where the thread 3 is located. In order to enable the special entry to point to the data with multiple copies in the node, a value of the special entry may be modified to point to areas according to a physical address that is of the data with multiple copies and is stored in the node.

Figure 3:
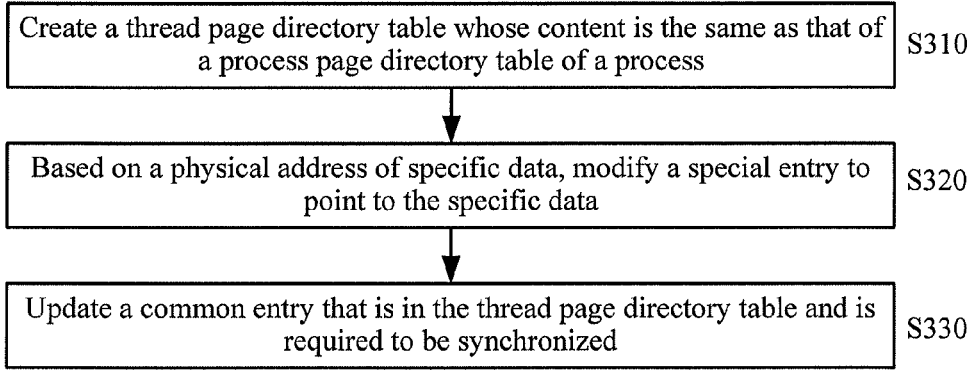
FIG. 3 is a flow chart of another method for multithread to access multiple copies according to an embodiment.

FIG. 3 is a flow chart of a method 300 for multi-data to access multiple copies according to an embodiment. The method 300 adds a step of synchronizing the common entry on the basis of the method 100, so as to further ensure the normal execution of the thread during the procedure of implementing multithread accessing multiple copies.

S310 and S320 in the method 300 are basically the same as S110 and S120 in the method 100.

In S330, during the procedure of executing the thread based on the thread page directory table of the thread, the common entry that is in the thread page directory table and is required to be synchronized is updated, so that each thread is executed normally.

After the address of the thread page directory table is loaded to the hardware register, the thread may be executed. During the procedure of executing the thread, a certain thread or certain threads may have common entries changed in corresponding thread page directory table(s) due to that memory space is newly applied memory space or released. This change is only embodied in the corresponding thread page directory table, common entries in the thread page directory tables of other threads will not be changed accordingly, and therefore, errors may occur in the procedure that other threads are executed based on the thread page directory tables of the other threads, for example, newly created memory space cannot be accessed, or a certain memory space that is invalid is still considered to be valid. Therefore, the common entries in the thread page directory tables need to be synchronized.

According to an embodiment, when a common entry in a specific thread page directory table is changed, based on the common entry, common entries in all other thread page directory tables are updated.

When a common entry in a certain thread page directory table is changed, the common entries in all other thread page directory tables are updated, for example, the content of the changed common entry in the thread page directory table is copied to the common entries in all other thread page directory pages.

All thread page directory tables of one process may be organized through a linked list. When a thread page directory table corresponding to a hardware register in any thread is modified, other thread page directory tables are updated. For example, when the thread page directory table of the main thread is the process page directory table, and the thread page directory table is changed during the procedure of execution, it can be judged whether the thread page directory table of the main thread changes, if the thread page directory table of the main thread changes, all other thread page directory tables are modified; otherwise, the modified process page directory table, that is, the thread page directory table of the main thread is notified, and other thread page directory tables are modified.

According to an embodiment, when a page-missing fault occurs in a specific thread, the thread page directory table that is changed is found; based on a common entry in the thread page directory table, the common entry of the thread page directory table of the specific thread is updated.

For example, in FIG. 2, it is assumed that the thread 2 makes a modification to its own thread page directory table after applying for releasing the memory. At this time, the thread 2 does not update the common entries in all other thread page directory tables immediately, and only records the modification of the thread page directory table of the thread 2. For example, which thread page directory table is modified is recorded by setting a mask flag bit, and each mask flag bit corresponds to a thread page directory table. When another thread, for example, the thread 3, accesses this area during the procedure of running, a page-missing fault is triggered. At this time, the thread 3 finds a thread page directory table that is modified in the system, for example, finds, through mask flag bits, which thread page directory tables are changed. When it is found that the thread page directory table of the thread 2 is modified, the thread 3 updates a common entry of the thread page directory table of the thread 3 to a common entry of the thread page directory table of the thread 2, thereby solving the page-missing fault so as to execute the thread normally.

By synchronizing the common entries of all the thread page directory tables in real time during the procedure of thread running, or by updating the common entry of the corresponding thread page directory table when the page-missing fault occurs, each thread is enabled to be executed normally when accessing the data with multiple copies, thereby ensuring the complete implementation of the process function. Moreover, the synchronization that is performed during the procedure of thread running does not need to additionally consume content space, and synchronization overhead in the case that the number of threads is small is also small.

Figure 4:
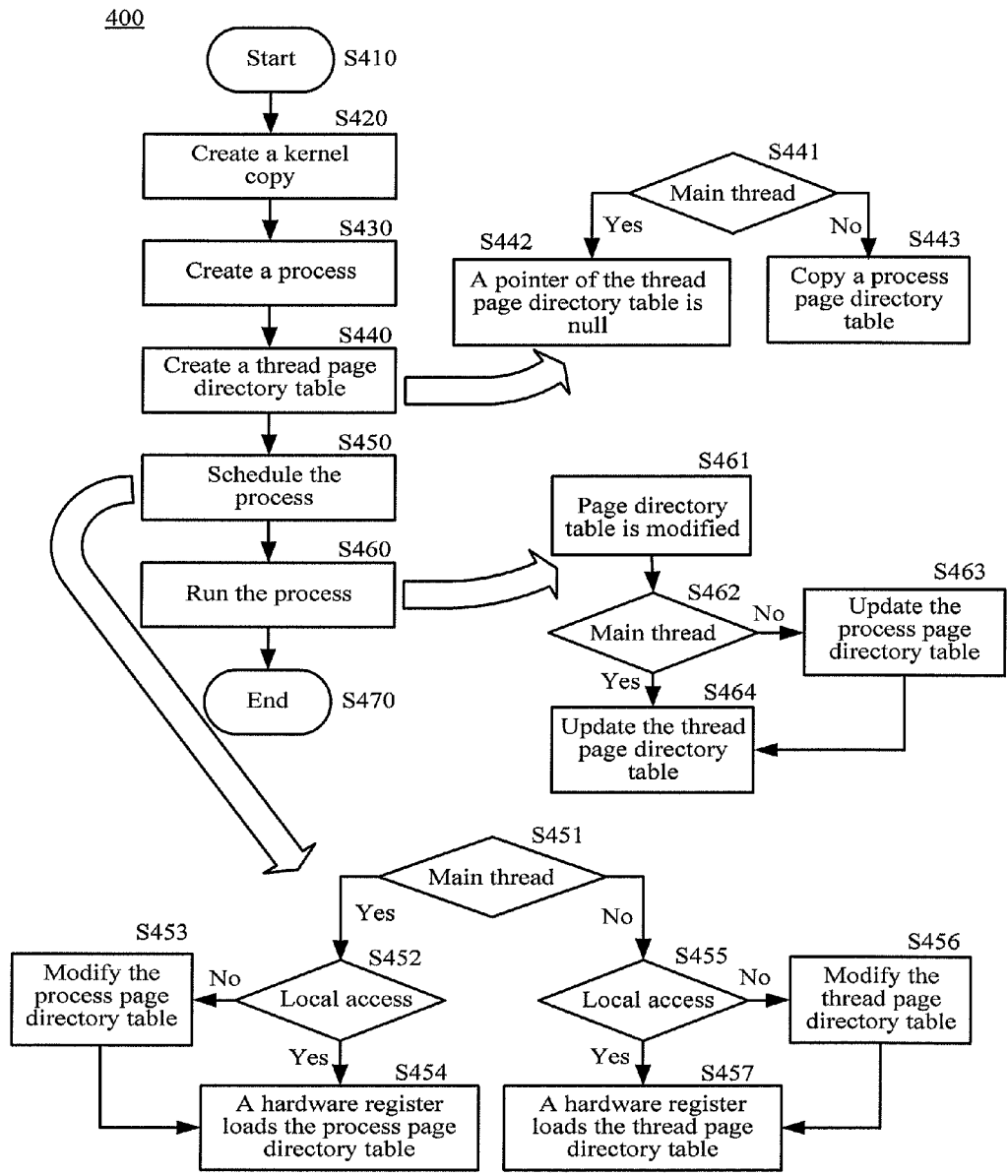
FIG. 4 is a flow chart of an overall procedure of completely executing a process under a condition of implementing multithread accessing multiple copies according to an embodiment.

A flow chart of an overall procedure in which multithread accessing multiple copies can be implemented while the threads can be executed normally is described by taking FIG. 4 as an example. In this example, specific data with multiple copies is a kernel copy, and persons skilled in the art may derive that the specific data may also be read-only data in a memory, and a procedure for implementation is similar to that of the kernel copy.

In S410, the procedure starts.

In S420, a kernel copy is created. Memory is applied at each node, the kernel code and kernel read-only data of a master node are copied to a newly applied memory, and in each node, a mapping relationship of the kernel copy of this node is recorded.

In S430, a process is created. The process is divided into multiple threads, and the threads are distributed to different nodes to be executed.

In S440, a thread page directory table is created. The thread page directory table is created for a newly created thread.

In S450, the process is scheduled. The process is divided into multiple threads, so the scheduling the process is scheduling the threads.

In S460, the process runs.

In S470, the procedure ends.

In the procedure of creating the thread page directory table in S440, content of the thread page directory table is made to be consistent with that of a process page directory table.

In S441, it is judged whether a thread, to which is directed by the created thread page directory table, is a main thread.

If it is judged that the thread is the main thread in S441, in S442, a pointer of the thread page directory table of the thread is set as null, and the process page directory table is served as the thread page directory table of the thread.

If it is judged that the thread is not the main thread in S441, in S443, the content of the process page directory table is copied to the thread page directory table generated for the thread.

In the procedure of process scheduling in S450, the thread page directory table is loaded.

In S451, when one thread is scheduled, it is judged whether the thread is the main thread. If it is determined that the thread is the main thread, proceed to S452, otherwise, proceed to S455.

In S452, it is judged whether the thread is capable of performing, based on a special entry in a corresponding thread page directory table, local access on the kernel copy. If in S452, it is determined that the kernel copy cannot be accessed locally, proceed to S453; otherwise, proceed to S454.

In S453, the special entry in the thread page directory table of the main thread, that is, the special entry in the process page directory table, is modified, so that the main thread is capable of accessing the kernel copy stored in a node where the main thread is located.

In S454, an address of the thread page directory table of the main thread, that is, an address of the process page directory table, is loaded to a hardware register corresponding to a processor that executes the main thread.

In S455, it is judged whether the thread is capable of performing, based on the special entry in the corresponding thread page directory table, the local access on the kernel copy. If in S455, it is determined that the kernel copy cannot be accessed locally, proceed to S456; otherwise, proceed to S457.

In S456, the special entry in the thread page directory table of the thread is modified, so that the thread is capable of accessing the kernel copy stored in the node where the thread is located.

In S457, The address of the thread page directory table of the thread is loaded to a hardware register corresponding to a processor executing the thread.

In this way, based on the operation in S450, thread page directory tables corresponding to all threads may be loaded, and the special entry in the thread page directory table is enabled to point to the kernel copy stored in the node where the thread is located, thereby performing the local access.

In the procedure of running the process in S460, a common entry that is of the thread page directory table and is required to be synchronized is modified. Here, synchronizing common entries of all thread page directory tables is described as an example.

In S461, the thread page directory table corresponding to a certain thread is modified. During the procedure of thread running, a common entry may be modified, so here, the modified entry is a common entry.

In S462, it is judged whether the thread is a main thread. If it is a main thread, proceed to S464; otherwise, proceed to S463.

In S463, the thread page directory table of the main thread is the process page directory table, and the common entry in the process page directory table is updated.

In S464, common entries in thread page directory tables of other threads other than the main thread are updated.

In this way, when the thread page directory table of a specific thread is changed, a common entry in the thread page directory table of the specific thread is used to update common entries in thread page directory tables of all other threads, so that all the threads may be executed normally.

Next, a flow chart of a method 500 for multithread to access multiple copies according to an embodiment is described with reference to FIG. 5. The method 500 may also enable all threads to be executed normally; however, compared with the method 300, instead of synchronizing a common entry of a thread page directory table during the procedure of running a thread, this method ensures the thread to be executed normally when the thread page directory table is created. S510 and S520 in the method 500 are basically the same as S110 and S120 in the method 100.

In S502, all address space to be used by a process is determined.

With respect to the process to be executed, all address space to be used by the process may be determined in advance. For example, all user space to be used by the process is reserved in advance.

In S504, based on all address space, a process page directory table is created to point to all the address space.

After all the address space to be used by the process is reserved, the process page directory table is created based on physical addresses of the space. For example, when the process creates a main thread, a page parent table may be applied for all user space of the process, and a corresponding page directory entry generated by an address of the table is filled in the process page directory table.

In this way, during the procedure of running the process, a common entry of the process page directory table will not be changed due to that a memory unit is newly applied or released, and therefore, the common entry may keep unchanged during the procedure of running. Therefore, when the common entry of the thread page directory table is consistent with the common entry of the process page directory table, the thread is enabled to be executed normally without the need of changing the common entry of the thread page directory table during the procedure of running. Moreover, the process page directory table is created by reserving all address space in advance, so as to create the thread page directory table. In this way, the efficiency overhead of synchronizing the thread page directory table during the procedure of running in the method 300 is saved, and the convenience of normal execution of each thread by consuming some memory space is achieved.

Figure 5:
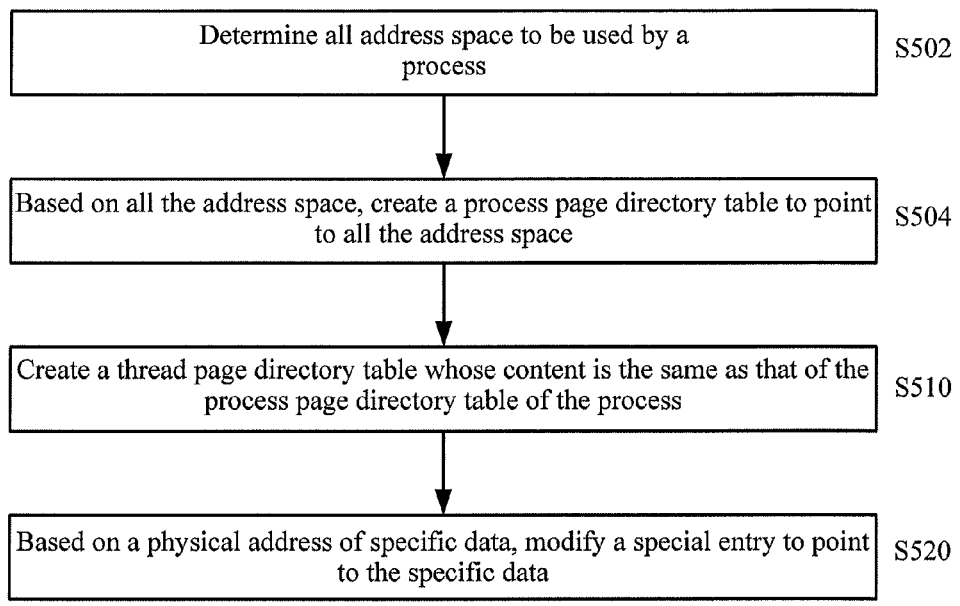
FIG. 5 is a flow chart of still another method for multithread to access multiple copies according to an embodiment.
Figure 6:
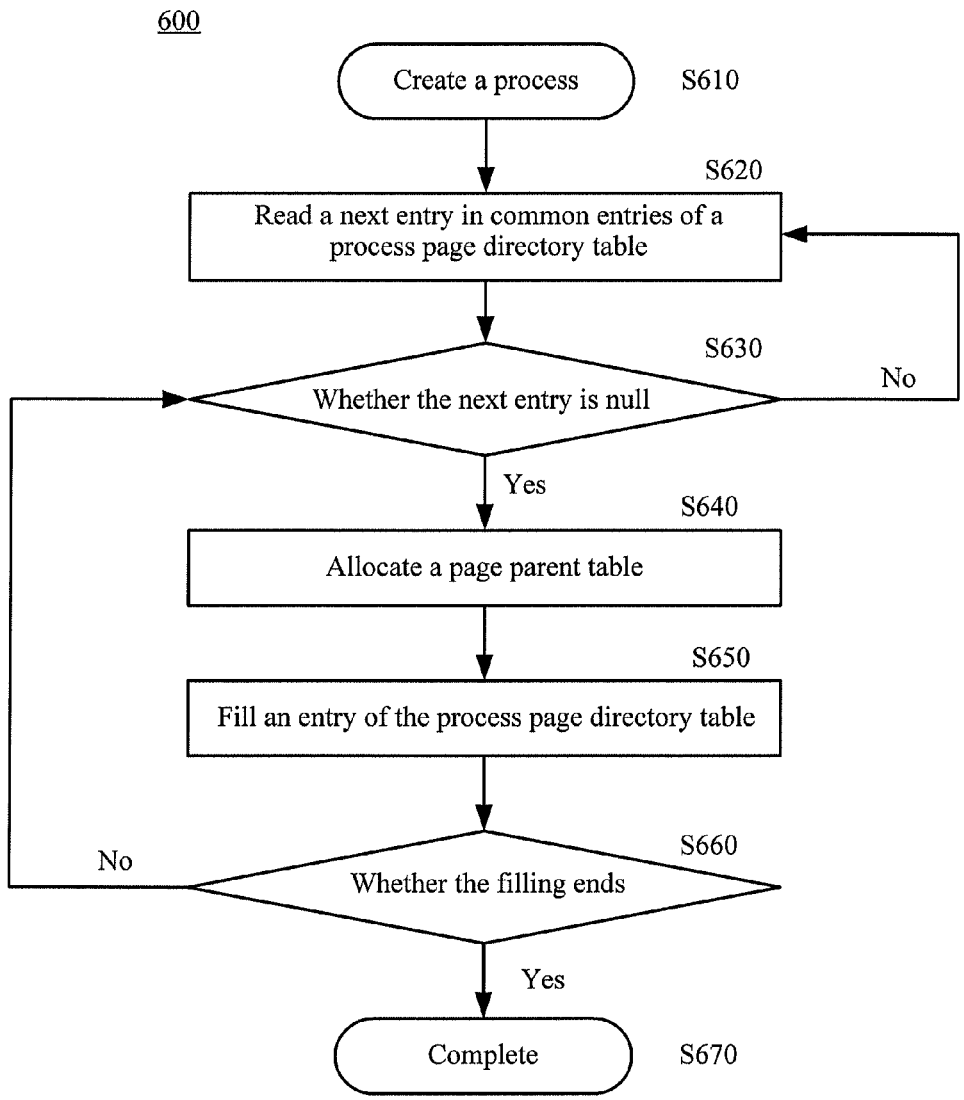
FIG. 6 is a flow chart of a method for creating a process page directory table in FIG. 5 according to an embodiment.

For example, the process page directory table in S504 of FIG. 5 may be created by using the manner shown in FIG. 6.

In S610, a process is created.

In S620, a next entry in common entries of the process page directory table is read.

In S630, it is judged whether the next entry is null. If the next entry is null, proceed to S640; otherwise, back to S620.

In S640, user space to be used by a process is reserved, and a page parent table is allocated.

In S650, based on the allocated page parent table, an entry in the process page directory table is filled in to point to the page parent table.

In S660, determining whether the filling of the process page directory table ends. If the filling ends, proceed to S670; otherwise, back to S630.

In S670, the filling of a common entry of the process page directory table is completed. In this way, the common entry of the process page directory table points to all user address space to be used by the process.

Figure 7:
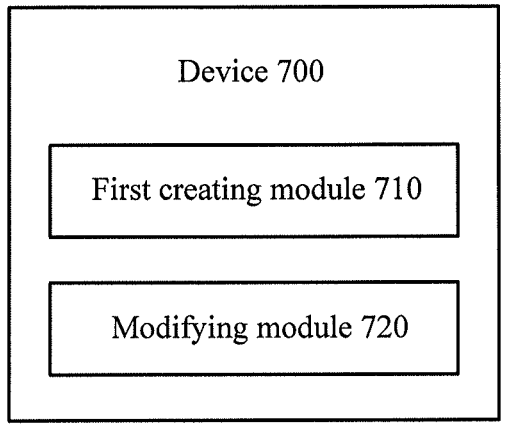
FIG. 7 is a structural block diagram of a device for multithread to access multiple copies according to an embodiment.
Figure 8:
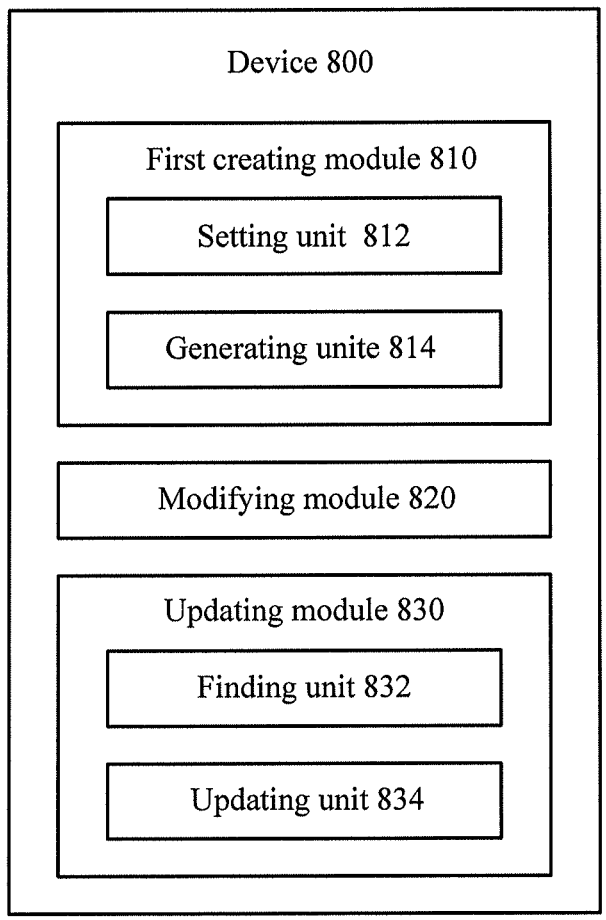
FIG. 8 is a structural block diagram of another device for multithread to access multiple copies according to an embodiment.
Figure 9:
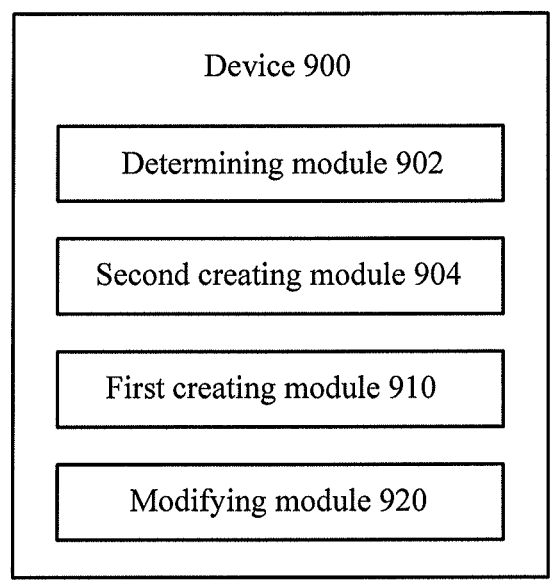
FIG. 9 is a structural block diagram of still another device for multithread to access multiple copies according to an embodiment.

The method for multithread to access multiple copies according to embodiments is described, and structural block diagrams of a device corresponding to the method are described in accompanying with FIG. 7 to FIG. 9.

FIG. 7 is a structure block diagram of a device 700 for multithread to access multiple copies according to an embodiment.

The device 700 includes a first creating module 710 and a modifying module 720. The first creating module 710 may be configured to, when multiple threads of a process are distributed to different nodes, create a thread page directory table whose content is the same as that of a process page directory table of the process, each thread page directory table includes a special entry, which points to specific data, and a common entry other than the special entry, each thread corresponds to one thread page directory table, execution of each thread is based on a corresponding thread page directory table, and the specific data is data with multiple copies at different nodes. The modifying module 720 may be configured to, when each thread is scheduled and the special entry in the thread page directory table of the each thread does not point to the specific data stored in a node where the thread is located, modify, based on a physical address of the specific data, the special entry to point to the specific data.

According to the embodiment, the specific data may include at least one of the following: a kernel code and kernel read-only data; read-only data in a memory.

According to the embodiment, each thread may correspond to their respective thread page directory tables only. Each thread may also correspond to one thread page directory table shared by at least two threads at the same node where the thread is located. In addition, a part of threads in the multiple threads may each correspond to their respective thread page directory tables only, and each of other threads may correspond to one thread page directory table shared by at least two threads at the same node where the each thread is located.

The foregoing and other operations and/or functions of the first creating module 710 and the modifying module 720 may be obtained with reference to S110 and S120 in the method 100, and are not repeated herein to avoid repetition.

According to the device provided in the embodiment, after the special entry of the thread page directory table is modified to point to the specific data such as the kernel code and the read-only data in the node where the thread is located, during the procedure of executing the thread, the thread may access, based on the special entry in the corresponding thread page directory table, the specific data in the node where the thread is located, thereby realizing multithread accessing multiple copies, avoiding the delay caused by accessing remote data and avoiding high requirements on transmission bandwidth, increasing efficiency of access to the data accessed frequently, and improving the system performance.

FIG. 8 is a structure block diagram of a device 800 for multithread to access multiple copies according to an embodiment. A first creating module 810 and a modifying module 820 of the device 800 are basically the same as the first creating module 710 and the modifying module 720 of the device 700.

According to an embodiment, the device 800 may further include an updating module 830. The updating module 830 may be configured to, during the procedure of executing each thread based on the thread page directory table of the thread, update a common entry that is in the thread page directory table and is required to be synchronized, so that each thread is executed normally.

According to an embodiment, the updating module 830 may be configured to, when a common entry in a specific thread page directory table is changed, update common entries in all other thread page directory tables on the basis of the common entry.

According to an embodiment, the updating module 830 may further include a finding unit 832 and an updating unit 834. The finding unit 832 may be configured to, when a page-missing fault occurs in a specific thread, find a thread page directory table that is changed. The updating unit 834 may be configured to, based on the common entries in the thread page directory table, update common entries in the thread page directory table of the specific thread.

According to an embodiment, the first creating module 810 may include a setting unit 812 and a generating unit 814. The setting unit 812 may be configured to set a process page directory table as a thread page directory table of a main thread. The generating unit 814 may be configured to, for other threads, generate a thread page directory table whose content is the same as that of the process page directory table.

The foregoing and other operations and/or functions of the updating module 830, the finding unit 832, the updating unit 834, the setting unit 812, and the generating unit 814 may be obtained with reference to S330 in the method 300 and S110 in the method 100, and are not repeated herein to avoid repetition.

In the device provided according to embodiments, by synchronizing the common entries of all the thread page directory tables in real time during the procedure of thread running, or by updating a common entry of a corresponding thread page directory table when the page-missing fault occurs, each thread is enabled to be executed normally when accessing the data with multiple copies, thereby ensuring the complete implementation of the process function. Moreover, the synchronization performed during the procedure of thread running does not need to additionally consume content space, and synchronization overhead in the case that the number of threads is small is also small.

FIG. 9 is a structure block diagram of a device 900 for multithread to access multiple copies according to an embodiment. A first creating module 910 and a modifying module 920 of the device 900 are basically the same as the first creating module 710 and the modifying module 720 of the device 700.

According to an embodiment, the device 900 may further include a determining module 902 and a second creating module 904. The determining module 902 may be configured to determine all address space to be used by the process. The second creating module 904 may be configured to, based on all the address space, create a process page directory table to point to all the address space. At this time, a thread page directory table created by the first creating module 910 is created based on the process page directory table created by the second creating module 904.

The foregoing and other operations and/or functions of the determining module 902 and the second creating module 904 may be obtained with reference to S502 and S504 in the method 500, and are not repeated herein to avoid repetition.

According to the device provided in the embodiment, during the procedure of running the process, a common entry of the process page directory table will not be changed due to that a memory unit is newly applied or released, and therefore, the common entry may keep unchanged during the procedure of running. Therefore, when the common entry of the thread page directory table is consistent with the common entry of the process page directory table, a thread is enabled to be executed normally without the need of changing the common entry of the thread page directory table during the procedure of running. Moreover, the process page directory table is created by reserving all address space in advance, so as to create the thread page directory table. In this way, the efficiency overhead of synchronizing the thread page directory table during the procedure of running in the method 300 is saved, and the convenience of normal execution of the threads by consuming some memory space is achieved.

Persons skilled in the art may further realize that, in combination with the embodiments herein, method steps and units can be implemented with electronic hardware, computer software, or the combination of the electronic hardware, computer software. In order to clearly describe the interchangeability between the hardware and the software, compositions and steps of each embodiment have been generally described according to functions in the foregoing descriptions. Whether the functions are executed in a mode of hardware or software depends on particular applications and design constraint conditions of the technical solutions. Persons skilled in the art can use different methods to implement the described functions for each particular application, but it should not be considered that the implementation goes beyond the scope of the embodiments.

In combination with the embodiments herein, steps of the method described may be directly implemented using hardware, a software program executed by a processor, or the combination of the hardware and the software program. The software program may be placed in a random access memory (RAM), a memory, a read-only memory (ROM), an electrically programmable ROM, an electrically erasable programmable ROM, a register, a hard disk, a removable magnetic disk, a CD-ROM, or any storage medium of other forms well-known in the technical field.

Some embodiments have been shown and described. However, it is understood that persons skilled may make various modifications to the embodiments. Such embodiments, as so modified, are understood to still fall within the scope of the claims.

What is claimed is:

1. A computer-implemented method for accessing multiple copies of data by a multithreaded process, comprising:
   when multiple threads of a process are distributed to a plurality of network nodes each having a processor and memory accessible to the processor, creating a thread page directory table with content that matches that of a process page directory table of the process, wherein each thread page directory table comprises a first entry, which points to specific data, and a common entry that is different than the first entry, wherein each thread corresponds to a thread page directory table, execution of each thread is based on a corresponding thread page directory table, and the plurality of network nodes comprise multiple copies of same data; and
   when each thread is scheduled and the first entry in the thread page directory table of each thread does not point to the specific data stored in a network node where the thread is located, modifying, based on a physical address of the specific data, the first entry to point to the first data.

2. The method according to claim 1, wherein while executing each thread based on the thread page directory table of the thread, the method further comprises updating the common entry that synchronization, so that the thread is executed normally.

3. The method according to claim 2, wherein updating of the common entry that is in the thread page directory table and that requires synchronization comprises:
   when a common entry in a specific thread page directory table is changed, updating common entries in all other thread page directory tables on based on of the common entry.

4. The method according to claim 2, wherein updating of the common entry that is in the thread page directory table and that requires synchronization comprises:
   when a page-missing fault occurs in a specific thread, finding a thread page directory table that is changed; and
   based on the common entry in the thread page directory table, updating a common entry in the thread page directory table of the specific thread.

5. The method according to claim 1, wherein before creating the thread page directory table whose content matches that of the process page directory table of the process, the method further comprises:
   determining an address space to be used by the process; and
   based on the address space, configuring the process page directory table to point to all the address space.

6. The method according to claim 1, wherein the same data comprises at least one of the following:
   a kernel code and kernel read-only data.

7. The method according to claim 1, wherein creating the thread page directory table whose content matches that of the process page directory table of the process comprises:
   setting the process page directory table to be a thread page directory table of a main thread; and for another thread, generating a thread page directory table whose content matches that of the process page directory table.

8. The method according to claim 1, wherein the same data comprises read-only data in the memory.

9. The method according to claim 1, wherein each thread that corresponds to one thread page directory table comprises one of the following:
   each thread corresponding to their respective thread page directory table only;
   each thread corresponding to one thread page directory table shared by at least two threads that are located on a same network node as the each thread; and
   a part of threads in the multiple threads each corresponding to their respective thread page directory tables only, and each of other threads corresponding to one thread page directory table shared by at least two threads that are located on the same network node as the each thread.

10. A device having a plurality of network nodes each having a processor and a memory accessible to the processor, the device configured to allow a multithreaded process to access multiple copies of data, comprising:
   a first creation module configured to create a thread page directory table whose content matches that of a process page directory table of the process when multiple threads of a process are distributed to network nodes, wherein each thread page directory table comprises a first entry that points to specific data, and a common entry different than the first entry, wherein each thread corresponds to a thread page directory table, execution of each thread is based on a corresponding thread page directory table, and the plurality of network nodes comprise multiple copies of same data; and
   a modification module configured to modify, based on a physical address of the specific data, the first entry to point to the specific data when each thread is scheduled and the special entry in the thread page directory table of each thread does not point to the specific data stored in a network node where the thread is located.

11. The device according to claim 10, further comprising: an updating module configured to update the common entry that is in the thread page directory table when the common entry requires synchronization while the procedure of executing the thread based on the thread page directory table of the thread, so that the thread is executed normally.

12. The device according to claim 11, wherein the updating module is configured to update common entries in all other thread page directory tables based on the common entry when a common entry in a specific thread page directory table is changed.

13. The device according to claim 11, wherein the updating module comprises:
   a finding unit configured to find a thread page directory table that is changed when a page-missing fault occurs in a specific thread; and
   an updating unit configured to update a common entry in the thread page directory table of the specific thread based on the common entry in the thread page directory table.

14. The device according to claim 10, further comprising:
   a determining module configured to determine an address space to be used by the process; and
   a second creating module configured to create the process page directory table to point to all the address space based on all of the address space.

15. The device according to claim 10, wherein the same data comprises at least one of the following:
   a kernel code and kernel read-only data.

16. The device according to claim 10, wherein the first creating module comprises:
   a setting unit configured to set the process page directory table to be a thread page directory table of a main thread; and
   a generating unit configured to generate, for another thread, a thread page directory table whose content is the same as that of the process page directory table.

17. The device according to claim 10, wherein each thread that corresponds to one thread page directory table comprises one of the following:
   each thread corresponding to their respective thread page directory table only;
   each thread corresponding to one thread page directory table shared by at least two threads that are located on a same network node as the each thread; and
   a part of threads in the multiple threads each corresponding their respective thread page directory tables only, and each of other threads corresponding to one thread page directory table shared by at least two threads that are located on the same network node as the each thread.

18. The device according to claim 10, wherein the same data comprises read-only data in the memory.

* * * * *